Patented Apr. 29, 1947

2,419,783

UNITED STATES PATENT OFFICE 2,419,783

ESTER DERIVATIVES OF LIGNIN SULPHONATES

Kermit Longley, Philadelphia, Pa., assignor to Quaker Chemical Products Corp., Conshohocken, Pa., a corporation of Pennsylvania No Drawing. Application January 31, 1944, Serial No. 520,539

2 Claims. (Cl. 260—124)

The invention relates to lignin derivatives, and more particularly to derivatives of lignin sulphonates.

The principal object of the invention is the preparation of new and useful lignin derivatives, including derivatives which are suitable for use as emulsifying agents and are of value as textile sizes.

Other objects and advantages of the invention will become apparent as the following description progresses.

In accordance with this invention, a lignin sulphonate such as, for example, a sodium salt of lignin sulphonic acid is reacted with an acylating agent such as a fatty acid chloride to produce an ester of the lignin sulphonate.

Any sulphonate may be used in the practice of this invention, including the sodium, calcium and barium salts of lignin sulphonic acid. The calcium salt of lignin sulphonic acid may be obtained from waste sulphite liquor by the procedures described in U. S. Patent Reissue No. 18,268 and No. 1,856,558 issued to Howard. The sodium salt of lignin sulphonic acid may be obtained from this calcium salt by heating the calcium salt with sodium sulphate as described under step 1 and step 2 of U. S. Patent 2,057,117.

The acylation of the lignin sulphonate may be carried out with any acid chloride, including aliphatic mono-basic and di-basic acid chlorides, and also aromatic acid chlorides. For the preparation of acylated lignin sulphonates which are particularly valuable as textile sizes and emulsifiers I prefer to use the higher fatty acid chlorides. By "higher fatty acid" is meant a monocarboxylic acid containing an unbroken chain of at least 7 carbon atoms bonded to a carboxyl group, e. g., stearic and oleic acids.

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

Example I

Fifty grams of sodium salt of lignin sulphonic acid ("Marthon 300") and fifty grams of stearyl chloride were mixed with 100 grams of xylene and placed in a round bottom flask fitted with a reflux condenser. The mixture was heated carefully until foaming subsided and then refluxed for two hours. The product was then filtered through a sintered glass funnel. Sixty five grams of an ivory colored wax were obtained when the xylene was evaporated. Approximately twenty-two grams of unreacted, water soluble lignin sulphonate remained on the filter. The stearic acid ester of the sodium salt of lignin sulphonate so obtained was dispersible in water but not soluble. This substance is an excellent emulsifier. This product dispersed in water is suitable for use as a rayon size.

As an emulsifier the stearic acid ester of the sodium salt of lignin sulphonate is useful in those places where the presence of soap is objectionable, and also in the cosmetic industry where heavy bodied emulsions are frequently used.

Example II

Fifty grams of lignin sulfonate, fifty grams of oleyl chloride and one hundred and fifty grams of xylene were refluxed together for three hours. It was filtered hot and the xylene was evaporated. The product was sixty eight grams of a water dispersible wax of somewhat lower melting point than the stearyl derivative.

The material of Example II may be used as a size as it is. The waxy material of Example II may also be used in cases where lubrication is important, as well as a certain amount of protection, as in rayon knitting.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. As a new product, a higher fatty acid ester of a lignin sulphonate.

2. As a new product, the stearic acid ester of sodium lignin sulfonate.

KERMIT LONGLEY.

REFERENCES CITED

The following references are of record in the file of this patent:

UNITED STATES PATENTS

| Number | Name | Date |
|---|---|---|
| 1,936,250 | Limburg | Nov. 21, 1933 |
| 2,156,160 | Olson | Apr. 25, 1939 |

FOREIGN PATENTS

| Number | Country | Date |
|---|---|---|
| 220,025 | British | July 28, 1924 |
| 46,189 | Swedish | Dec. 13, 1919 |
| 122,499 | Austrian | Apr. 15, 1931 |

OTHER REFERENCES

Heuser et al., "Cellulose Chemie," 5 pp. 13–21, March 2, 1924. (Copy in Pat. Office Lib.)